United States Patent [19]

Livi et al.

[11] Patent Number: 4,629,527
[45] Date of Patent: Dec. 16, 1986

[54] METHOD AND UNIT FOR MOUNTING AN ARRAY OF MIRRORS OF THE SSM ("SECOND SURFACE MIRROR") TYPE ON A PANEL OF A SPACECRAFT

[75] Inventors: Francesco Livi, Rivoli; Dario Boggiatto, Torino, both of Italy

[73] Assignee: Aeritalia-Societa Aerospaziale Italiana-per Azioni, Italy

[21] Appl. No.: 800,236

[22] Filed: Nov. 21, 1985

[30] Foreign Application Priority Data

Nov. 23, 1984 [IT] Italy ................. 68171 A/84

[51] Int. Cl.$^4$ .............. B32R 31/00; B23P '19/00; B25B 11/00
[52] U.S. Cl. ................. 156/285; 29/462; 29/468; 29/469; 29/DIG. 1; 269/21; 156/539
[58] Field of Search .......... 29/DIG. 1, 428, 462, 29/469, 700, 468; 248/466, 363; 350/574, 320; 269/21; 156/285, 538, 539

[56] References Cited

U.S. PATENT DOCUMENTS

| | | | |
|---|---|---|---|
| 3,765,289 | 10/1973 | Gerber et al. | 269/21 |
| 3,818,823 | 6/1974 | Bond | 156/285 |
| 4,220,491 | 9/1980 | Metcalf et al. | 156/285 |
| 4,262,594 | 4/1981 | Landsman | 269/21 |
| 4,301,999 | 11/1981 | Higgins et al. | 269/21 |
| 4,382,833 | 5/1983 | Coyle et al. | 156/285 |
| 4,422,893 | 12/1983 | Duchateau et al. | 156/285 |
| 4,469,737 | 9/1984 | Kain | 156/285 |
| 4,505,771 | 3/1985 | George | 156/285 |

Primary Examiner—Howard N. Goldberg
Assistant Examiner—Irene Graves Golabi
Attorney, Agent, or Firm—Sughrue, Mion, Zinn, Macpeak, and Seas

[57] ABSTRACT

An array of mirrors of the SSM ('Second Surface Mirror") type is fixed to the outer surface of a panel of a spacecraft, for example an artificial satellite, for the purpose of heat control. The fixing of the mirrors to the panel is achieved by gluing in a series of operations which ensure the correct positioning of the mirrors, the effectiveness of the adhesion, and electrical conductivity through the array of mirrors. In the application of the mirrors, use is made of a fixed structure for supporting the panel, a transferring tool on which the mirrors are temporarily retained in contact with separate support areas by a vacuum, and a loading tool arranged to receive the mirrors from the transferring tool and apply them to the panel.

9 Claims, 8 Drawing Figures

FIG. 2

METHOD AND UNIT FOR MOUNTING AN ARRAY OF MIRRORS OF THE SSM ("SECOND SURFACE MIRROR") TYPE ON A PANEL OF A SPACECRAFT

BACKGROUND OF THE INVENTION

The present invention relates to rigid mirrors of the type called SSMs ("Second Surface Mirrors"), which can be used on the panels of spacecraft, particularly artificial satellites, for the purpose of heat control.

More particularly, the invention concerns a method and a unit for mounting an array of SSMs on a panel of a spacecraft, particularly an artificial satellite.

The internal temperature of an artificial satellite must be kept under control in order to ensure the perfect efficiency of the apparatus within the satellite.

The methods used until now for controlling the temperature of spacecraft, and particularly artificial satellites, make use of active systems and passive systems. The active systems employ fairly complicated and delicate devices (cooling systems, thermostats, etc.) which, although ensuring more precise control of the temperature than passive systems, prejudice the reliability and the lightness of the satellite.

It is generally preferred, therefore, to use passive systems which ensure temperature control of the spacecraft by maintaining a strict equilibrium between the incident radiant energy absorbed by the outer surface of the spacecraft from radiant energy sources in space, and the energy emitted by the spacecraft and the energy reflected into space. In other words, the energy emitted into space must be equal to the sum of the energy generated in the form of heat by the equipment within the spacecraft and the energy from radiant energy sources in space.

These passive systems make particular use of radiant surfaces which are able to reflect heat from the exterior and transmit heat from the interior of the vehicle and generated by apparatus with which it is equipped.

Various types of radiant surfaces have been made in the past for controlling the temperature of spacecraft. In general, in order to form these surfaces, it is necessary to achieve a compromise between the need to provide very good optical properties and the need to ensure a prolonged working life. These requirements do, in fact, oppose each other in that a very satisfactory optical surface is also easily degradable and is exposed to the risk of damage as a result of bombardment by the various types of radiation to which the surface is subject when in space.

An optimum solution which is able to satisfy both these needs effectively is constituted by rigid mirrors of the so-called SSM ("Second Surface Mirror") type. Typically, one is dealing with mirrors constituted by rectangular or square sheets of glass generally having a size of between 400 mm$^2$ and 1600 mm$^2$ and a thickness of 150–200 microns. The glass is coated on one surface with a silver film having a thickness of 100–1000 Angstroms. In more recent types, the mirror is also coated overall with a layer of tin and indium oxide. This layer of electrically conductive material ensures that the electric charges which tend to accumulate on the mirrors when the satellite is in space are discharged to the metal mass of the satellite panel which supports the mirrors. In fact, these SSM mirrors constitute surfaces with very high resistivities which may accumulate a high electrical potential. The electrical charges accumulated on the SSMs may become so high as to give rise to an arc discharge from the surfaces of the mirrors to the underlying metal surface of the spacecraft, and also to discharges between adjacent mirrors. In order to avoid this effect, it is necessary to ensure an electrical connection between the various mirrors and between the mirrors and the metal panel which supports them.

A number of requirements must be taken into account in the application of the SSMs to a panel of a spacecraft: First of all it is necessary, for the reasons explained above, to ensure an electrical connection between the various mirrors themselves and between the various mirrors and the panel of the spacecraft; in the second place the mirrors must be located precisely, ensuring that the plane of the mirror is as parallel as possible to the plane of the panel. If this were not the case, adjacent mirrors would not be coplanar, with disadvantages with regard to the characteristics of emissivity of the radiant surface. Finally, there is a need, no less important than those indicated above, to achieve the application of the mirrors in a simple and quick manner.

Until now, to the knowledge of the Applicants, the only existing method for the mounting of an array of mirrors of the type indicated above on a panel of a spacecraft consists of fixing each mirror manually to the panel by gluing. On the other hand, if one takes into account the fact that an artificial satellite may be equipped with a very large number of mirrors (a surface of about 8 m$^2$, for example, corresponds to about 10,000 mirrors), it is clear that the manual method used up to now involves very high labour costs and time.

To the knowledge of the applicants, however, no one has succeeded until now in achieving a method for the rapid mounting of SSMs on a panel of a spacecraft, which ensures that the necessary characteristics of planarity, cleanness of the surfaces, effectiveness of adhesion, and electrical connection to earth are obtained.

THE OBJECT OF THE INVENTION

The object of the present invention is to provide a method and a unit for mounting an array of rigid mirrors of the SSM type on a panel of a spacecraft, which ensures the aforementioned characteristics of correct positioning of the mirrors, effectiveness of adhesion, electrical connection of the mirrors to earth, and cleanness of the surfaces, and which at the same time allows the application of the mirrors with very low working times and costs compared with the conventional manual method.

THE INVENTION

In order to achieve this object, the invention provides a method for mounting an array of mirrors of the SSM ("Second Surface Mirror") type on a panel of a spacecraft, characterised in that it includes the following operations:
  providing a fixed support structure for the panel;
  mounting the panel on the support structure;
  providing a mirror transferring tool having a mirror support plane with a series of ribs which define a plurality of support areas for the mirrors, each support area having at least one hole communicating with an internal cavity in the tool;
  connecting the internal cavity to a low-pressure source;
  placing the mirrors on the respective support areas of the transferring tool with their surfaces intended to adhere to the panel in contact with the transferring tool;

providing a loading tool having a mirror support plane with a plurality of holes communicating with an internal cavity in the loading tool;

mounting the loading tool above the transferring tool with the respective support planes facing each other;

breaking the connection between the cavity in the transferring tool and the low-pressure source and connecting the cavity in the loading tool with a low-pressure source so as to transfer the mirrors from the transferring tool to the loading tool;

applying a layer of electrically-conductive adhesive to the surface of the panel intended to receive the mirrors;

mounting an auxiliary frame on the support structure for supporting the loading tool above the adhesive-covered surface of the panel;

placing the loading tool on the auxiliary frame with the series of mirrors carried by the loading tool facing the adhesive-covered surface of the panel;

providing resilient means between the auxiliary frame and the loading tool for biassing the loading tool to a raised position in which the mirrors carried by the loading tool are slightly spaced from the adhesive-covered surface of the panel;

lowering the loading tool against the action of the resilient means into a position in which the mirrors are in contact with the layer of adhesive on the surface of the panel, and holding the loading tool in the lowered position;

breaking the connection between the cavity of the loading tool and the low-pressure source and connecting the cavity to a source of pressurised fluid so as to detach the mirrors from the loading tool and effect their adhesion to the panel.

The method of the invention allows a drastic reduction in the working times compared with the conventional manual method and, at the same time, effectively satisfies all the requirements set out above. It is noted in particular that the use of a transferring tool provided with ribs defining the mirror support areas allows the mirrors to be placed on the panel of the spacecraft while ensuring the existence of an interspace of a precisely predetermined width between the various mirrors. This interspace is filled with electrically-conductive adhesive which allows the electrical conductivity between the various mirrors to be achieved, ensuring the continuity of electrical conduction over the entire radiant surface. The planarity of the mirrors and the panel is also ensured by virtue of the use of the transferring tool and the loading tool.

The invention also provides a unit for carrying out the method described above, this unit being characterised in that it comprises:

a fixed support structure for the panel;

a transferring tool having a support plane with a series of ribs which define a plurality of support areas for the mirrors, each support area having at least one hole communicating with an internal cavity of the transferring tool which can be connected to a low-pressure source to ensure the temporary attachment of the mirrors to the transferring tool;

a loading tool having a mirror support plane with a plurality of holes communicating with an internal cavity in the loading tool;

reference means for locating the tools in a superposed position with the respective support planes facing each other, so as to allow the transfer of the mirrors from the transferring tool to the loading tool, the connection between the internal cavity of the transferring tool and the low-pressure source being broken and the internal cavity in the loading tool being connected to the low-pressure source;

an auxiliary frame which can be mounted on the support structure for supporting the loading tool above the panel with the support plane of the loading tool facing the surface of the panel intended to receive the mirrors;

resilient means which can be interposed between the loading tool and the auxiliary frame to bias the loading tool towards a raised position in which its support plane is spaced from the surface of the panel;

means for lowering the loading tool against the action of the resilient means into a position in which the mirrors carried by the loading tool are in contact with the panel, and for holding the loading tool in this lowered position.

Further characteristics and advantages of the method of the invention will also become apparent from the description which follows with reference to the appended drawings provided purely by way of non-limiting example.

Figure 1:
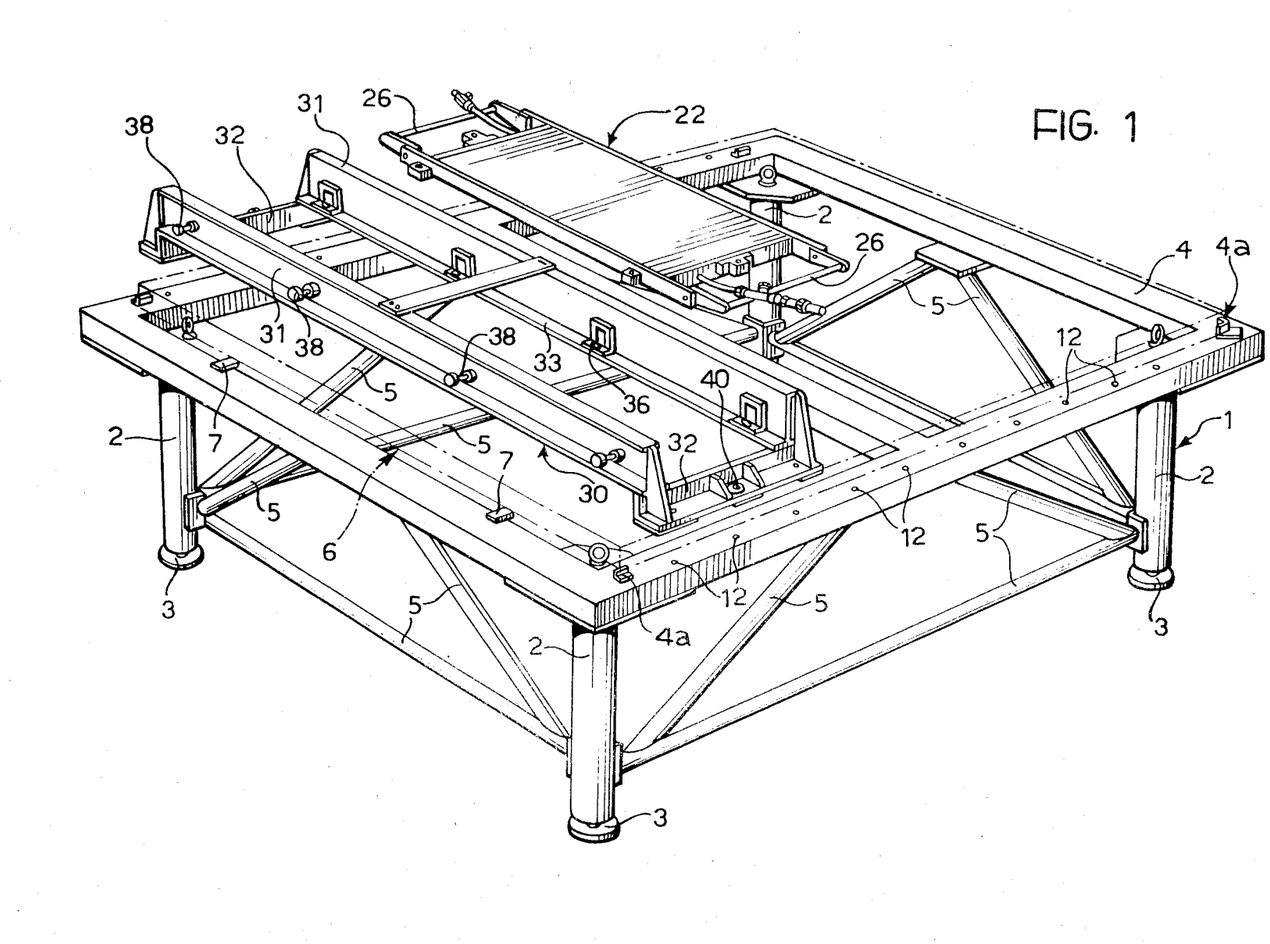
FIG. 1 is an exploded perspective view of part of the equipment used for carrying out the method of the invention.

FIG. 1 illustrates part of the equipment used in the method according to the invention. This equipment comprises a fixed support structure 1 constituted, for example, by light alloy members welded together and including, in the embodiment illustrated, four support legs 2 having adjustable feet 3. The support structure 1 also includes a frame 4 and a stiffening lattice constituted by bars 5 which connect the legs 2 to each other and to the frame 4.

Reference numeral 6 generally indicates a panel (shown in broken outline in FIGS. 1 and 3) of a spacecraft, particularly an artificial satellite. The panel 6, which is intended to receive an array of mirrors of the type called SSMs ("Second Surface Mirrors") on one face, is fixed to the frame 4 with its face intended to receive the mirrors facing upwardly.

The frame 4 has reference stops 4a on its upper surface for locating the panel 6 in a precisely determined position on the support structure 1. The panel 6 is fixed to the frame 4 by the fixing of the panel itself to a series of plates 7 (see also FIG. 3) which are connected to the frame 4 by bolts 8. Each bolt 8 is engaged in a slot 9 in the respective plate 7 to allow adjustment of the position of the latter.

Figure 3:
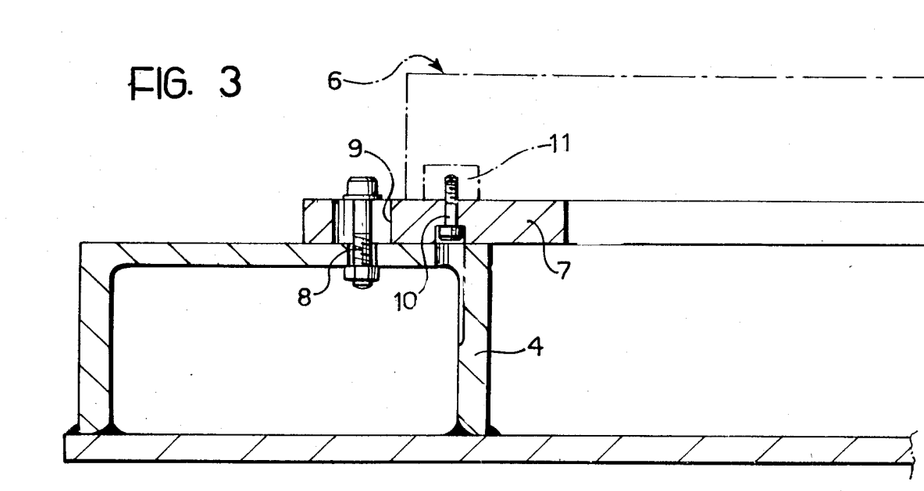
FIG. 3 is a sectional view of a further detail of FIG. 1 on an enlarged scale.

The panel 6 is fixed to each plate 7 by the engagement of a screw 10 in a nut 11 carried by the panel.

The panel of the artificial satellite may be of any known structure; in particular, it may be constituted by a honeycomb structure of light alloy.

Finally, the support structure 1 includes a plurality of threaded sockets 12 with vertical axes, which are disposed on the upper surface of the frame 4 and spaced apart from each other by a strictly constant distance. The function of the sockets 12 will become clearer below.

The method for mounting the SSM mirrors on the panel 6 provides for an operation of cleaning of the surface of the panel 6 intended to receive the mirrors, after the positioning and fixing of the panel 6 on the fixed support structure 1. This cleaning may be effected by a degreasing solvent, for example methyl ethyl ketone.

It will become clear from the description below that, in general, the surface of the panel is divided ideally into different zones which are covered successively with the mirrors, all the mirrors associated with each zone being applied simultaneously. The following description refers to the method necessary for applying the mirrors to a predetermined zone of the surface of the panel.

Once the degreasing of the zone of the surface concerned has been completed, this zone is defined by the application of adhesive tape around its perimeter. A layer of primer is then applied to the zone of the surface of the panel defined by the adhesive tape with a brush and is dried at ambient temperature for at least one hour. The optimum thickness of the dried primer for the purposes of the subsequent adhesion of the mirrors to the panel is between 2 and 5 microns. For example, it is possible to use the primer sold under the name G-790 by the German company Wacker as the primer.

A layer of the primer is also applied to the face of each mirror intended to be placed in contact with the panel. Before the application of the primer to the mirrors, the electrical-conductivity characteristics between the surfaces of each mirror are checked. For this purpose, an electronic ohm-meter is used, the electrodes of which are placed in contact with the two opposite faces of the mirror. By means of this device, the existence of a predetermined electrical resistance between the two faces of each mirror can be checked. Once this check has been carried out and those mirrors whose electrical resistance differs from a predetermined value (for example, 1000 ohms) by a degree greater than the tolerance value have been discarded, the mirrors intended to be applied to the zone of the panel defined by the adhesive tape are placed on a temporary support plane, for example, a rubber-coated wood surface. The handling of the mirrors is carried out by suction tools (direct manual contact must be avoided due to the ease of deterioration of the SSMs). The various mirrors are deposited on the temporary support plane with the faces intended to be applied to the panel facing upwardly. Once the mirrors have been positioned on the temporary support plane, the primer may be applied to them by a spray gun. The layer of primer applied to the mirrors is then also dried for at least one hour at ambient temperature.

In the method of the invention, the mirrors are fixed to the surface of the panel by an electrically-conductive adhesive.

It is possible to use, for example, a two-component silicone adhesive of the type sold commercially under the name RTV 566 by General Electric and rendered conductive by mixing with silver powder of the type called "CHOBOND 1029" and sold by Chomerics.

The adhesive is prepared by the following successive steps: first of all, the silver powder is dried in a dry metal container which has previously been degreased. The container is then placed in an oven under vacuum at a temperature of 100° C. for the next 65 hours. The degree of vacuum may be $10^{-2}$ Torricelli. Once this treatment is finished, the silver powder may be mixed with the RTV 566 adhesive. The latter has two components, that is, the base resin RTV 566/A and the hardener RTV 566/B. The proportions of the mixture may be as follows:

100 parts by weight of RTV 566/A, 250 parts by weight of silver powder, 0.15 parts by weight of RTV 566/B.

Figures 4, 5:
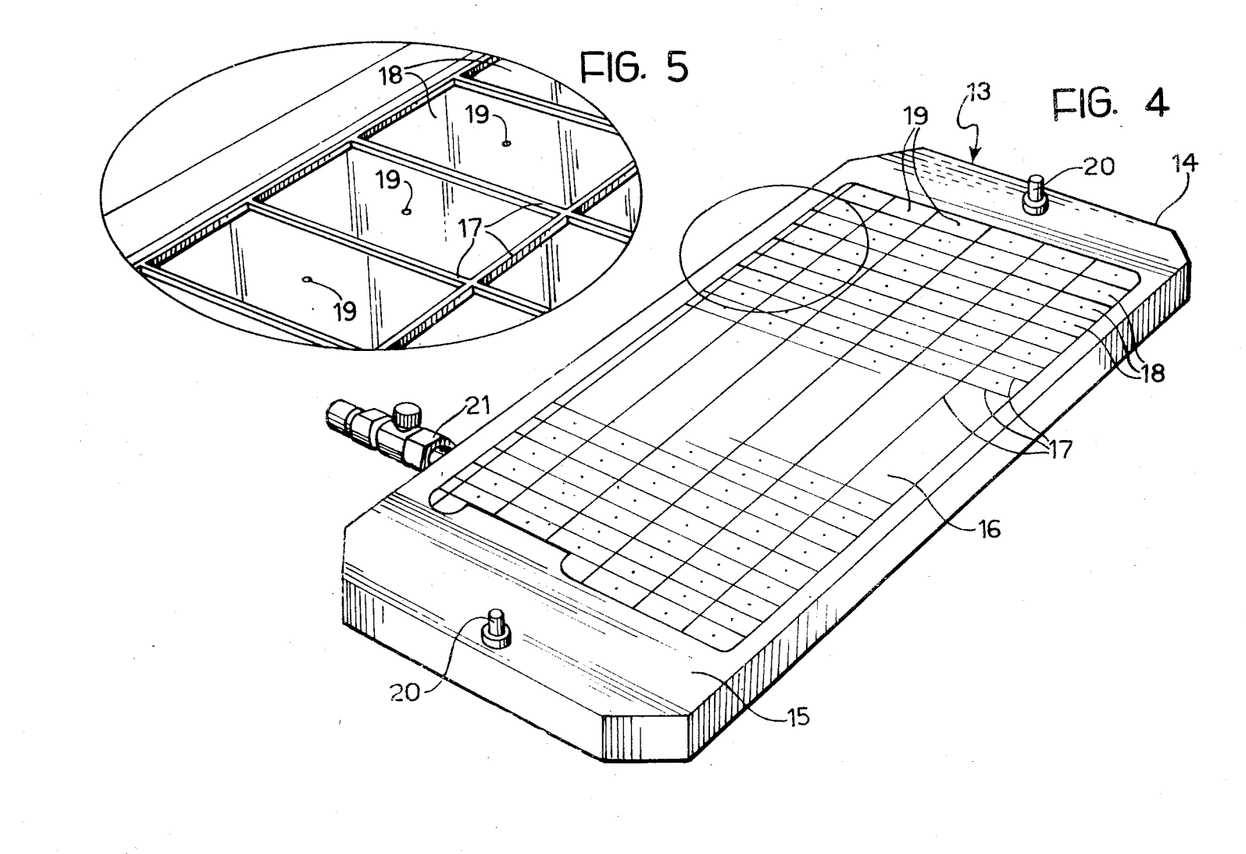
FIG. 4 is a perspective view of an element forming part of the equipment used for carrying out the method of the invention.
FIG. 5 is a view of a detail of FIG. 4 on an enlarged scale.

A transferring tool, indicated 13, has a hollow body 14 which defines a support plane 15 for the mirrors. The structure of the transferring tool may be of metal, for example, and the support plane 15 may have an active support surface 16 coated with plastics material. The active support surface 16 has a grid of metal ribs 17 which define a plurality of mirror support areas 18. In each support area 18 (see FIG. 5), the support surface 16 has at least one hole 19 communicating with the internal cavity of the transferring tool 13. Finally, the latter is provided with two reference pins 20 the function of which will be explained below, and a union 21 for connecting the internal cavity of the tool to a low-pressure source (not illustrated). Once the layer of primer on the mirrors has dried, the latter may be taken up by a suction tool and located each on a respective support area 18 of the transferring tool 13 with the primer-covered surface facing the support area 18. Before the location of the mirrors on the areas 18 of the transferring tool 13, the internal cavity of the latter is connected by the union 21 to the low-pressure source so that, once positioned, the mirrors are retained on the transferring tool by the low pressure, due to the presence of the holes 19.

The presence of the ribs 17 ensures correct positioning of the mirrors on the transferring tool and, in particular, the obtention of the correct spacing between each mirror and the adjacent mirror. As will become apparent from the description below, this ensures that, when the mirrors are glued to the panel of the artificial satellite at the end of the process, there is an interspace of constant width between the adjacent mirrors, which is filled with electrically-conductive adhesive. This ensures the continuity of the electrical conduction through the array of mirrors applied to the panel. A further advantage resulting from the presence of the ribs 17 is that of checking the correct dimensions of each mirror. If the dimensions of a particular mirror are outside the tolerances allowable, it is not in fact possible to position the mirror on the respective support area 18.

Figures 6, 7:
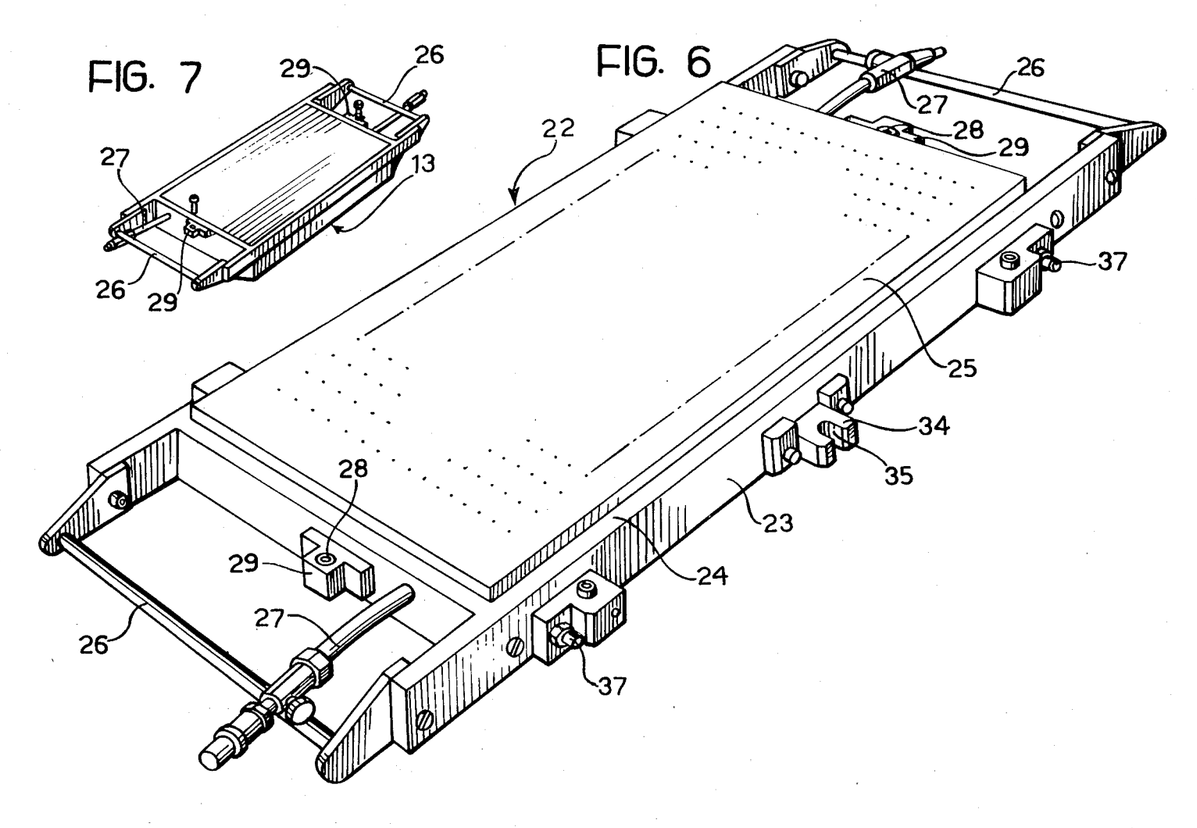
FIG. 6 is a perspective view of a further element forming part of the equipment used for carrying out the method of the invention.
FIG. 7 illustrates the elements of FIGS. 4 and 6 in a particalar condition of use.

In FIG. 6, a tool for loading the mirrors onto the panel is indicated 22. The loading tool 22 has a hollow metal structure 23 with a support plane 24 covered by a layer of silicone rubber 25. This rubber is preferably treated so as to prevent suction of the mirrors. The metal body 23 of the loading tool 22 has handles 26 at its two ends to facilitate the handling of the tool, and it also has two unions 27 connected to the internal cavity of the tool. A plurality of holes 25a communicating with the internal cavity of the tool open onto the support plane 24.

The mirrors previously disposed on the transferring tool are then transferred to the loading tool by the following operations: first of all, the transferring tool is located on a working surface. As already mentioned above, the mirrors are retained on the transferring tool by a vacuum effect during this stage, in that the internal cavity of the tool is connected to a low-pressure source. The loading tool illustrated in FIG. 6 is then located in an overturned condition above the transferring tool 13. The correct mutual positioning of the two tools is ensured by the engagement of the reference pins 20 provided on the transferring tool 13 with two reference holes 28 formed in two brackets 29 fixed to the end edges of the loading tool 22. The two tools are illustrated in the superposed condition in FIG. 7. At this point, the connection between the internal cavity of the transferring tool and the low-pressure source is broken and, simultaneously, the internal cavity of the loading tool is connected to this low-pressure source. Thus, the mirrors are transferred from the transferring tool to the loading tool. In the superposed condition of the two tools, in fact, the mirrors are interposed between the support surface 16 of the transferring tool and the support surface 25 of the loading tool.

The operations for transferring the mirrors from the transferring tool to the loading tool are preferably carried out during the preparation of the adhesive mixture. The zone of the surface of the panel intended to receive the mirrors is then treated with the adhesive mixture to prepare it for receiving the mirrors carried by the loading tool. The adhesive is spread by a metal spatula and the thickness of the adhesive layer is made uniform manually, with the aid of a sharp-edged bar which is slid over the adhesive-covered surface to achieve a uniform spread.

Figure 2:
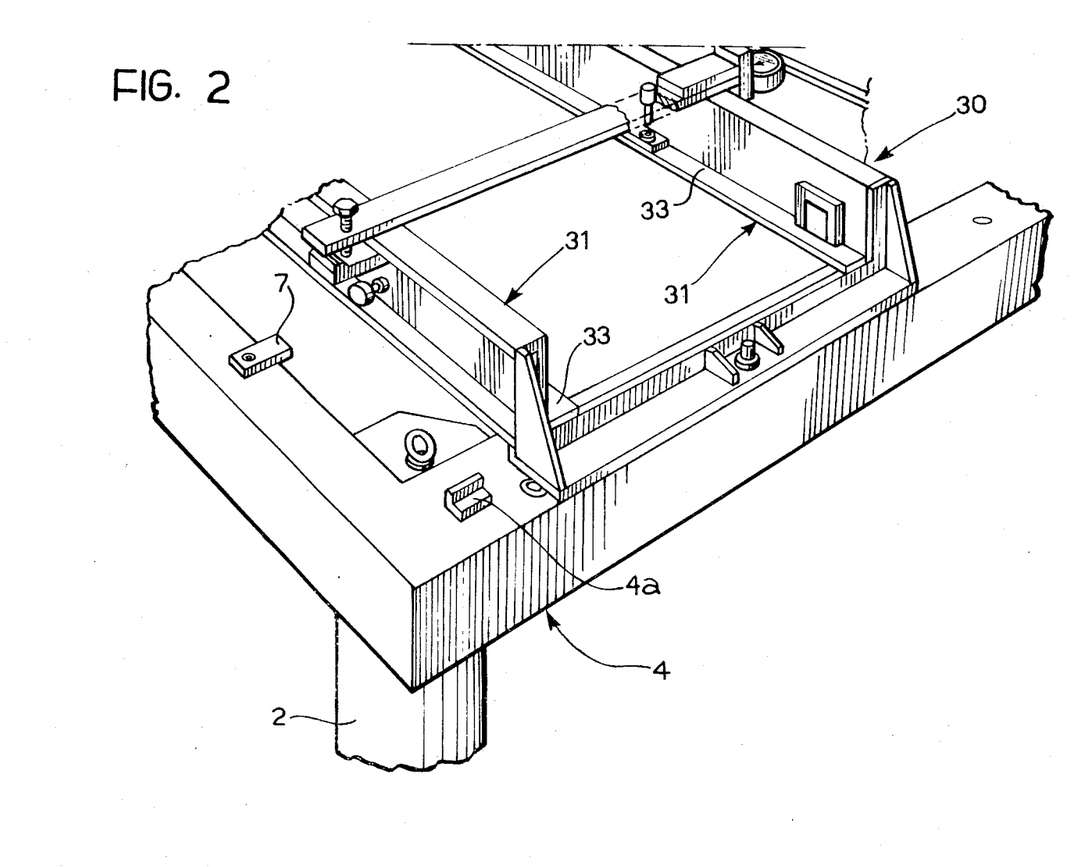
FIG. 2 is a view of a detail of FIG. 1 on an enlarged scale.

The mirrors carried by the loading tool are transferred onto the adhesive-covered zone of the surface of the panel by the positioning of the loading tool above this zone. For this purpose, an auxiliary frame 30 is provided which, in the example illustrated in the drawings (see FIGS. 1 and 2), is generally bridge-shaped. In particular, the frame 30 includes two elongate parallel beams 31 joined at the ends by two supporting cross members 32 intended to be fixed to two opposite sides of the surrounding frame 4 and to support the beams 31 in positions slightly above the position of the panel 6. The two beams 31 have two flat edges 33 on their facing sides for the support of the opposing longitudinal edges of the loading tool 22.

With reference to FIG. 6, the loading tool 22 has on one longitudinal edge a central bracket 34 with a seat 35 arranged to engage a reference pin 36 located on one of the two flat support edges 33. On the same longitudinal edge, the loading tool 22 has two pins 37 for coming into contact with the beam 31 facing them in the mounted condition of the loading tool on the bridge frame 30. Once the loading tool 22 has been placed on the two longitudinal flat edges 33, in fact, the pins 37 are thrust against the beam 31 facing them by means of a clamping screw 38 with which the opposite beam 31 is provided and which is adapted to engage the longitudinal edge of the loading tool 22 opposite that carrying the pins 37. The auxiliary frame is provided with a series of clamping screws 38 and reference pins 37 for allowing the positioning of the loading tool 22 in different positions along the frame 30, so as to cover the entire width of the panel. Similarly, the bridge frame can be fixed in different parts of the frame 4 so as to allow for the entire length of the panel. The fixing of the frame 30 to the frame 4 is achieved by the engagement of precision screws (not illustrated) in end holes 40 in the frame 30 and the threaded sockets 12 in the frame 4.

The frame 30 is located so as to allow the loading tool 22 to be superposed on the adhesive-covered zone of the panel. In the assembled condition of the loading tool 22 illustrated in FIG. 8, the series of mirrors retained on the loading tool by the vacuum faces the adhesive-covered surface of the panel. In this stage, however, the mirrors are slightly spaced from the surface of the panel, in that the loading tool 22 rests on the longitudinal flat edges 33 by means of sprung feet 41. Resilient means are thus interposed between the frame 30 and the loading tool, which tend to keep the loading tool in a raised position in which the array of mirrors carried by the loading tool is spaced slightly from the adhesive-covered surface of the panel.

Figure 8:
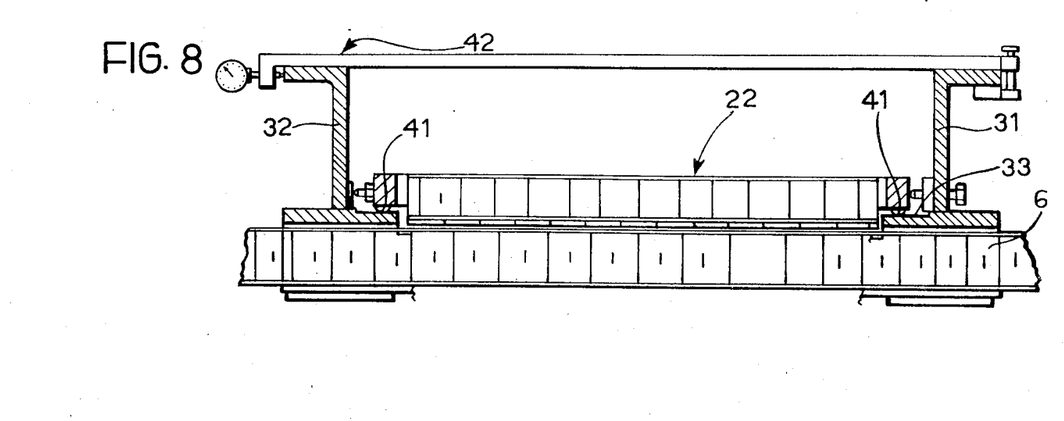
FIG. 8 is a further detail of the equipment in a stage of the method according to the invention.

The presence of the sprung feet 41 allows the loading tool to be positioned correctly without the mirrors touching the layer of adhesive on the panel. The use of the pins 37 and clamping screws 38 ensures the perfect positioning of the mirrors on the panel. The parallelism of the two beams 31 of the structure of the bridge frame 30 can be checked by means of a measuring tool 42 which is disposed astride the two beams 31 in different zones along the length of these beams.

Once the loading tool has been positioned, the latter can be lowered against the action of the springs of the feet 41 into a position in which the mirrors carried by it come into contact with the adhesive-covered surface of the panel. The lowering is achieved by the application of weights. Once the lowering has been effected, the connection between the internal cavity of the loading tool and the low-pressure source is broken and the internal cavity is connected to a source of pressurised fluid, for example a source of air pressurised to $1-1.2$ kg/cm$^2$.

In this way, the mirrors are made to adhere to the panel.

The connection of the internal cavity of the loading tool to the pressurised-fluid source is then broken and the weights removed, so as to allow the loading tool to move away from the mirrors applied to the panel as a result of the resilient means with which the bearing feet of the loading tool are provided.

At this point, the loading tool and the frame 30 may be removed so as to enable the final stage of the method to be carried out. The zone covered with mirrors is coated with a flexible covering (not illustrated) sealed along the perimeter of the panel, and the cavity defined by the flexible cover is put into communication with the low-pressure source.

The low pressure applied must be at least 600 mm of mercury and the mirrors must be maintained in this condition for at least 4 hours. After this period, the flexible cover can be removed but a further period of 7 days is needed to complete the polymerisation of the adhesive.

After their application, the mirrors may have traces of dirt so it is necessary to carry out cleaning.

Naturally, the principle of the invention remaining the same, the constructional details and forms of embodiment of the tool used in carrying out the process may be varied widely with respect to that described and illustrated purely by way of example.

We claim:

1. Method for mounting an array of mirrors of the SSM ("Second Surface Mirror") type on a panel (6) of a spacecraft, including the following operations:

providing a fixed support structure (1) for the panel (6);

mounting the panel (6) on the support structure (1);

providing a mirror transferring tool (13) having a mirror support plane (16) provided with a series of ribs (17) which define a plurality of support areas (18) for the mirrors, each support area (18) having at least one hole (19) communicating with an internal cavity in the tool;

connecting the internal cavity to a low-pressure source; placing the mirrors on the respective support areas (18) of the transferring tool (13) with their surfaces intended to adhere to the panel (6) in contact with the transferring tool (13);

providing a loading tool (22) having a mirror support plane (25) with a plurality of holes (25a) communicating with an internal cavity in the loading tool;

mounting the loading tool (22) above the transferring tool (13) with the respective support planes (25, 16) facing each other;

breaking the connection between the cavity in the transferring tool (13) and the low-pressure source and connecting the cavity in the loading tool (22) with a low-pressure source so as to transfer the mirrors from the transferring tool (13) to the loading tool (22);

applying a layer of electrically conductive adhesive to the surface of the panel (6) intended to receive the mirrors;

mounting an auxiliary frame (30) on the support structure (1) for supporting the loading tool (22) above the adhesive-covered surface of the panel (6);

placing the loading tool (22) on the auxiliary frame (30) with the series of mirrors carried by the loading tool (22) facing the adhesive-covered surface of the panel;

providing resilient means between the auxiliary frame (30) and the loading tool (22) for biassing the loading tool (22) to a raised position in which the mirrors carried by the loading tool are slightly spaced from the adhesive-covered surface of the panel (6);

lowering the loading tool (22) against the action of the resilient means into a position in which the mirrors are in contact with the layer of adhesive on the surface of the panel (6), and holding the loading tool (22) in the lowered position;

breaking the connection between the cavity of the loading tool and the low-pressure source and connecting the cavity to a source of a pressurised fluid so as to detach the mirrors from the loading tool (22) and effect their adhesion to the panel (6).

2. Method according to claim 1, wherein in that the method further includes, after the operation of connecting the cavity of the loading tool (22) to the pressurised-fluid source, the following operations:

breaking the connection between the cavity of the loading tool (22) and the pressurised-fluid source;

stopping the pressing action previously exerted on the loading tool (22) so as to allow the latter to return to its raised position;

removing the loading tool (22) from the auxiliary frame (30);

covering the surface of the panel carrying the mirrors with a flexible cover sealed along the perimeter of the panel, and connecting the chamber defined by the flexible cover to a low-pressure source.

3. Method according to claim 1, wherein before the application of the layer of adhesive to the surface of the panel (6) intended to receive the mirrors, this surface is cleaned and coated with a layer of primer.

4. Method according to claim 1, wherein before the mirrors are placed on the transferring tool (13), the surface of each mirror intended to be in contact with the panel (6) is covered with a layer of primer.

5. Unit for mounting an array of mirrors of the SSM ("Second Surface Mirror") type on a panel of a spacecraft, comprising:

a fixed support structure (1) for the panel (6);

a transferring tool (13) having a support plane (16) with a series of ribs (17) which define a plurality of support areas (18) for the mirrors, each support area (18) having at least one hole (19) communicating with an internal cavity of the transferring tool (13) which can be connected to a low-pressure source to ensure the temporary attachment of the mirrors to the transferring tool (13);

a loading tool (22) having a mirror support plane (25) with a plurality of holes (25a) communicating with an internal cavity in the loading tool (22);

reference means (20,28) for locating the tools in a superposed position with the respective support planes (16,25) facing each other so as to allow the transfer of the mirrors from the transferring tool (13) to the loading tool (22), the connection between the internal cavity of the transferring tool with the low-pressure source being broken and the internal cavity of the loading tool (22) being connected to the low-pressure source;

an auxiliary frame (30) which can be mounted on the support structure (1) for supporting the loading tool (22) above the panel (6) with the support plane (25) of the loading tool (22) facing the surface of the panel intended to receive the mirrors;

resilient means which can be interposed between the loading tool (22) and the auxiliary frame (30) to bias the loading tool (30) towards a raised position in which its support plane (25) is spaced from the surface of the panel;

means for lowering the loading tool (22) against the action of the resilient means into a position in which the mirrors carried by the loading tool (22) are in contact with the panel (6), and for holding the loading tool (22) in this lowered position.

6. Unit according to claim 5, wherein the auxiliary frame (30) has a bridge structure including two elongate beams (31) having two lower flat edges (33) on their facing sides, for supporting the loading tool (22).

7. Unit according to claim 6, wherein the loading tool (22) has abutment members (37) on one side for engaging one of the two elongate beams (31), and in that the other elongate beam (31) has means for pushing the loading tool (22) towards the opposite beam so as to bring the abutment members (37) into contact with the beam.

8. Unit according to claim 7, wherein the auxiliary frame has two end members (32) which interconnect the ends of the two elongate beams (31) and have holes for engagement by screws for fixing the auxiliary frame (30) to the support structure (1), the structure having a frame (4) for supporting the panel (6) and a series of threaded sockets (12) at constant intervals along at least two opposite sides of the frame (4) for engagement by the fixing screws of the auxiliary frame (30).

9. Unit according to claim 8, wherein the frame (4) has reference means (4a) for the correct positioning of the panel (6), and fixing means (7-11) for fixing the panel to the frame (4).

* * * * *